(12) United States Patent
Sroka et al.

(10) Patent No.: US 6,445,399 B1
(45) Date of Patent: *Sep. 3, 2002

(54) SYSTEM AND METHOD OF VISUAL ORIENTATION

(75) Inventors: Yigal Sroka; Gilad Adiv, both of Haifa (IL)

(73) Assignee: Rafael - Armament Development Authority Ltd., Haifa (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,058

(22) Filed: Jan. 20, 1998

(51) Int. Cl.$^7$ .............................. G09G 5/00; G09K 9/36
(52) U.S. Cl. ........................ 345/767; 345/764; 345/860; 382/103; 382/294
(58) Field of Search ................................ 348/135–160; 382/103, 104, 105, 137, 141, 147, 148, 294, 128, 131, 154, 164, 165, 169, 170, 171, 172, 236, 289

(56) References Cited

U.S. PATENT DOCUMENTS

| | | | | |
|---|---|---|---|---|
| 4,672,559 A | * | 6/1987 | Jansson et al. | 382/128 |
| 5,032,989 A | * | 7/1991 | Tornetta | 705/1 |
| 5,054,097 A | * | 10/1991 | Flinois et al. | 382/44 |
| 5,155,774 A | | 10/1992 | Numagami | 382/1 |
| 5,182,728 A | * | 1/1993 | Shen et al. | 367/7 |
| 5,253,338 A | * | 10/1993 | Tanaka | 345/340 |
| 5,479,206 A | * | 12/1995 | Ueno et al. | 348/211 |
| 5,638,523 A | * | 6/1997 | Mullet et al. | 345/326 |
| 5,706,416 A | * | 1/1998 | Mann et al. | 345/427 |
| 5,754,348 A | * | 5/1998 | Soohoo | 359/802 |
| 5,926,581 A | * | 7/1999 | Pritt | 382/294 |
| 5,940,538 A | * | 8/1999 | Spiegel et al. | 382/236 |
| 6,031,930 A | * | 2/2000 | Bacus et al. | 382/133 |
| 6,054,990 A | * | 4/2000 | Tran | 345/358 |

OTHER PUBLICATIONS

Burt, P.J. et al., "Object Tracking with a Moving Camera", *Proceedings of the Workshop on Visual Motion*, 1989, pp. 2–12.

Holben, R.D., "An MTI (Moving Target Indicator) Algorithm for Passive Sensors", *Proceedings of the IEEE 1980 National Aerospace and Electronics Conference*, May 1980, pp. 114–121.

Irani, M. et al., "Computing Occluding and Transparent Motions", *International Journal of Computer Vision*, 1993, pp. 1–19.

(List continued on next page.)

*Primary Examiner*—Ba Huynh
(74) *Attorney, Agent, or Firm*—Eitan, Pearl, Latzer & Cohen-Zedek

(57) ABSTRACT

A system and method for providing images of a searching area and for assisting the visual orientation of a user observing the images of the area is provided. The system includes a reference memory, a camera, a transformation unit and a display unit. The reference memory stores a wide field of view (FOV) reference image of the searching area. The camera produces zoomed images of selected portions of the searching area, the zoomed images of the selected portions having an FOV not greater than the wide FOV of the reference image. Transformation means generate transformations between each of the zoomed images and the reference image, and the display means displays both the wide FOV reference image and one of the zoomed images currently viewed by the camera and, on the reference image, displays a frame indicating where, within the searching area, the camera is currently viewing the selected portion of the searching area.

28 Claims, 4 Drawing Sheets

OTHER PUBLICATIONS

Adiv, G., "Determining Three–Dimensional Motion and Structure from Optical Flow Generated by Several Moving Objects", *IEEE Transactions on Pattern Analysis and Machine Intelligence*, vol. PAMI–7, No. 4, Jul. 1985, pp. 384–401.

Anandan, P., "A Computational Framework and an Algorithm for the Measurement of Visual Motion", *International Journal of Computer Vision*, vol. 2, pp. 283–310 (1989).

Clark, C.S. et al., "High–accuracy model matching for scenes containing man–made structures", *SPIE*, vol. 186, pp. 54–62 (1979).

Clark, C.S. et al., "Matching of Natural Terrain Scenes", *Proceedings of the International Conference on Pattern Recognition*, pp. 217–222 (1980).

Adiv, G., "Motion Analysis", *Encyclopedia of AI*, pp. 620–632 (1987).

Brown, L.G., "A Survey of Image Registration Techniques", *ACM Computing Surveys*, vol. 24, No. 4, Dec. 1992, pp. 326–376.

\* cited by examiner

SYSTEM AND METHOD OF VISUAL ORIENTATION

FIELD OF THE INVENTION

The present invention relates generally to systems and methods of visual orientation.

BACKGROUND OF THE INVENTION

Systems for observing an area of interest are known in the art. They typically are located on a moving vehicle, such as an airplane, or they are stationary on the land, and they are utilized to view the nearby terrain and to determine the details of objects within the area of interest.

For example, it may be desired to find all of the trees in a plantation which have a certain disease. This example utilizes a viewing system on an airplane which flies over the plantation of trees. The user first views the plantation with a wide field of view, enabling him to get a feel for the layout of the plantation and to know his current global position with respect to the plantation. However, in order to view the marks of the disease and thereby to find the diseased trees, the user typically has to zoom in on each tree. In the zoomed resolution, while the user can see the details of any tree much better, the field of view is much smaller and therefore, it is extremely difficult to maintain one's "orientation" or a global sense of where one is looking. Certainly, if the user keeps the observing system in the zoomed state and, in that state, moves the system to view other trees, the user will eventually not know where within the plantation of trees he is and, furthermore, will be unable to know whether the diseased tree he is currently viewing is one he has viewed previously. In order to regain a feel for his location, the user has to return to the non-zoomed state.

In prior art observation systems, there is a conflict between a viewer's need to know, globally, where he is looking and his need to view the area of interest in detail.

U.S. Pat. No. 5,155,774 describes an observation system which attempts to provide users with position information regarding the objects within a field of view. To do so, the system of '774 compares a detailed map with the current image of the observation system. The objects of the map are correlated with the objects of the image, thereby to determine which objects are being viewed.

However, if the terrain being viewed has changed since the map was created, the system of '774 does not work. Furthermore, it does not help a user to orient himself within the situation of the plantation of trees as described hereinabove, since few maps have details of such a plantation.

SUMMARY OF THE PRESENT INVENTION

It is an object of the present invention to provide an orientation system by which the user can maintain his overall knowledge of a global area being searched while viewing only a small portion of the area being searched.

In accordance with the present invention, the orientation system first views the area being searched with a wide field of view (FOV). This produces a reference image of the global area to search. The reference image is displayed on a viewing screen while the orientation system is zoomed towards an area of interest. The current field of view of the orientation system is noted, typically by a frame, on the continually displayed reference image. As the user moves the zoomed orientation system around the searching area, the frame of the current field of view moves around the reference image. Thus, the user can continually know where, within the global searching area shown in the reference image, the narrow field of view which he is viewing is.

Furthermore, when a user wants to remember an object, e.g. for example one of the diseased trees in the plantation, he can mark the tree in the zoomed image. The mark will also be displayed on the reference image. Thus, the present system enables the user to know where, in the global searching area, the object of interest is located. If the user passes an area previously searched, the previously found objects in that area will be noted with marks. Thus, the user can always tell which objects he has previously seen.

There is therefore provided, in accordance with a preferred embodiment of the present invention, a system and method for providing visual orientation to a user. The system includes a reference memory, a camera, a transformation unit and a display unit. The method steps are performed by the elements of the system.

In accordance with a preferred embodiment of the present invention, the reference memory stores a wide field of view (FOV) reference image of a searching area, whether generated from the camera or externally. The camera produces images of portions of the searching area with FOVs of not greater than the wide FOV. The transformation unit generates transformations between each of the zoomed images and the reference image. The display unit displays both the reference image and a current image of a portion of the scene and also displays, on the reference image, a frame indicating where, within the scene, the camera is currently viewing.

Additionally, in accordance with a preferred embodiment of the present invention, the display unit includes a unit for indicating an object of interest and a unit for displaying a mark in at least the reference image indicating the location of the object of interest.

Furthermore, in accordance with a preferred embodiment of the present invention, the transformation unit includes a unit for utilizing previous transformations to determine the current transformation. Alternatively, the transformation unit includes a unit for utilizing external camera information and for utilizing previous transformations to determine the current transformation.

Still further, in accordance with a preferred embodiment of the present invention, the unit for displaying a mark includes a unit for displaying the mark additionally in the current zoomed image if the current zoomed image views a portion of the reference image in which an object has already been marked.

Additionally, in accordance with one embodiment of the present invention, the camera is movable. Alternatively, the camera is stationary.

Finally, in accordance with one embodiment of the present invention, the reference image is received from a camera. Alternatively, the reference image is received externally.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Reference is now made to FIGS. 1, 2A, 2B and 3 which illustrate the orientation system of the present invention and its general operation.

The orientation system of the present invention comprises a camera 10 viewing a searching area 14, an image processor 16 and two display units 18A and 18B. The camera 10 can be located on a moving vehicle or a stationary device.

In accordance with a preferred embodiment of the present invention, initially, the camera 10 views the searching area with a wide field of view. The image processor 16 captures an image of the searching area 14, known herein as the "reference image" 20, stores the image and displays it on one of the displays 18A of FIG. 1 (or on a portion of display 18A if there is only one display).

Figure 1:
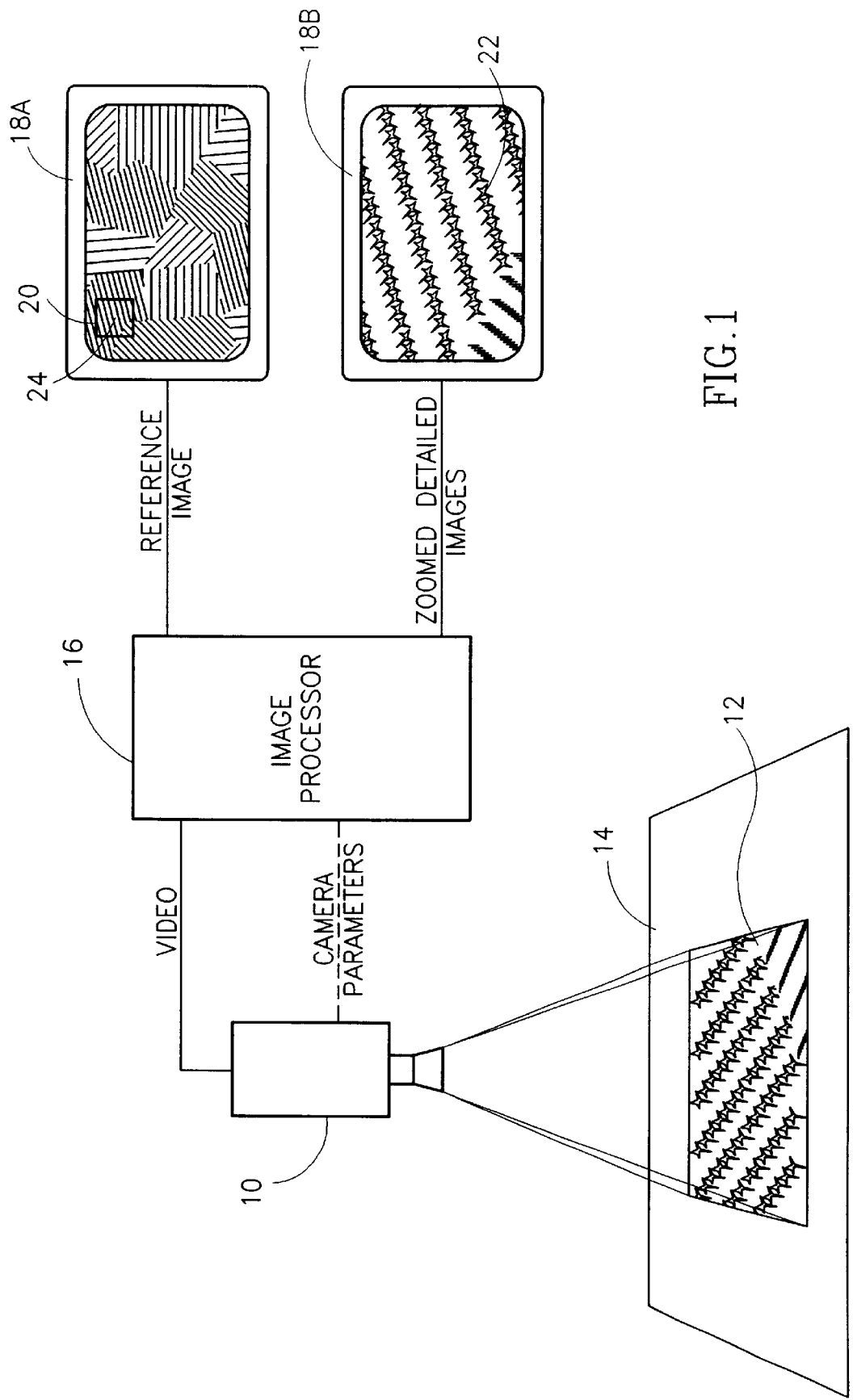
FIG. 1 is a schematic, block diagram illustration of an orientation system, constructed and operative in accordance with a preferred embodiment of the present invention viewing a searching area.

Once the reference image 20 is captured, the camera 10 zooms in, either continually or by predefined steps, towards an area of interest 12 which is a portion of searching area 14. As the camera 10 zooms in, the image processor 16 continually captures and displays a zoomed image 22 of the area of interest 12 on the other display 18B, or on a portion of the display 18A if there is only one display. In FIG. 1, one such zoomed image 22 is shown on display 18B. Throughout the capturing of zoomed images 22, the reference image 20 is continually displayed, thereby to orient the user within the reference image 20 while he is viewing the details shown in the detailed image 22.

The image processor 16 determines the size and location of the zoomed image 22 within the reference image 20 of the searching area 14 and utilizes this information to mark the reference image 20 with a frame 24 representing the location of the area of interest 12 within the searching area 14. The frame 24 can be determined through geometric transformations between the reference image 20 and the zoomed image 22 or from parameters of camera 10 such as extent of zoom and angle of view.

It is noted that the zoomed image 22 of the area of interest 12 is a zoomed view and contains information which may not be found in the reference image 20.

Figure 2A:
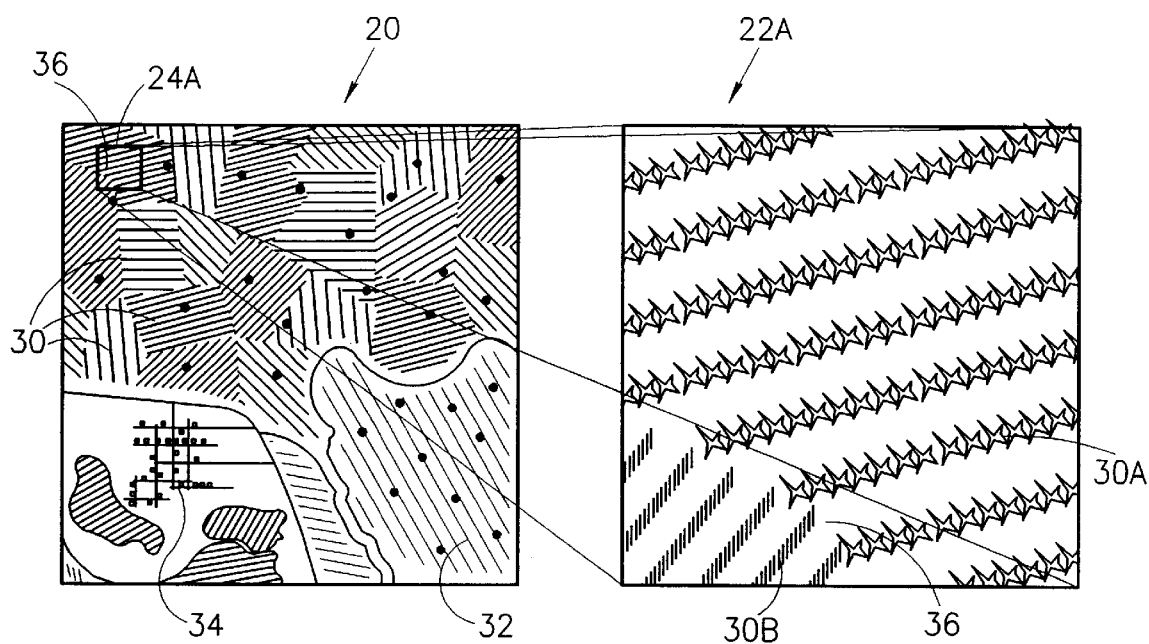
FIGS. 2A and 2B are two schematic illustrations of exemplary screen displays provided by the orientation system of FIG. 1.
Figure 2B:
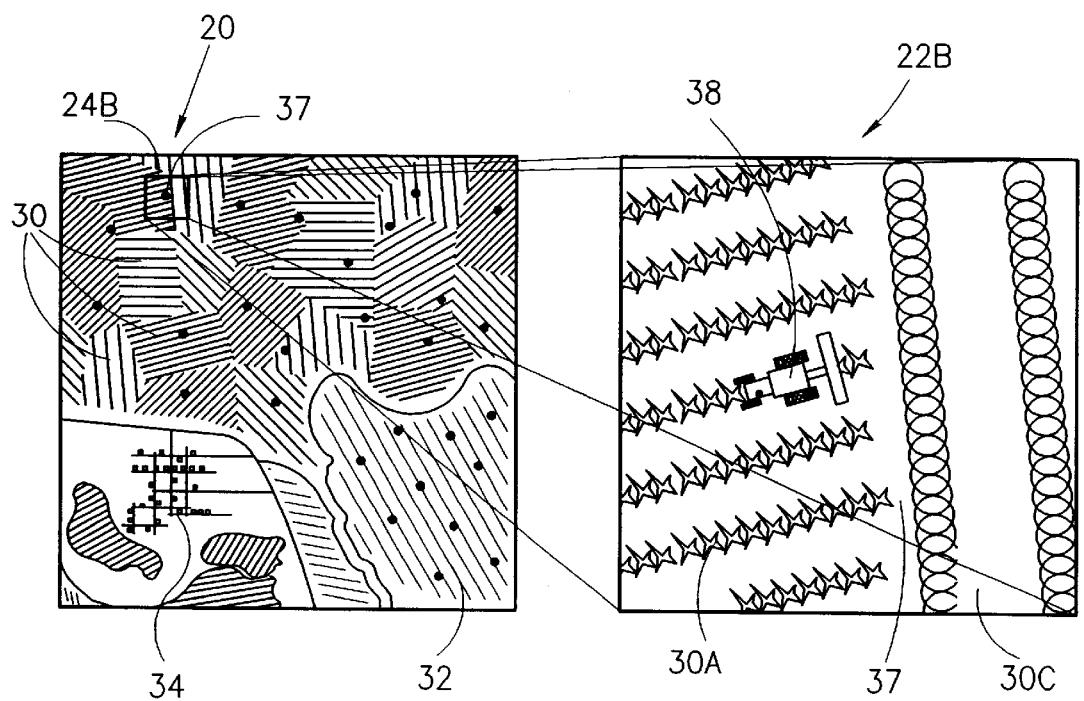

FIGS. 2A and 2B illustrate a schematic reference image 20 with two different zoomed images 22a and 22b and two frames 24a and 24b, respectively. The reference image 20 shows a scene with fields 30, a pond 32 and a settlement 34.

Zoomed image 22a illustrates an edge 36 between two fields 30a and 30b. Its location within the searching area 14 is noted by frame 24a on reference image 20 of FIG. 2A. As can be seen, frame 24a surrounds a portion of reference image 20 which includes the edge 36 in it, although the fields 30 which meet at edge 36 are not detailed.

Between FIG. 2A and 2B, the camera 10 moves so as to view another portion of field 30a. The frame 24a moves accordingly and becomes frame 24b of FIG. 2B. Zoomed image 22b is then shown on display 18B (while, at the same time, reference image 20 is displayed on display 18A). Zoomed image 22b shows field 30a, a new field 30c and a new edge 37 between fields 30a and 30c. Zoomed image 22b also shows a tractor 38, a detail which may exist in reference image 20, but, if it does exist, it is not clear enough to identify it.

As can be seen, the system of the present invention enables the user to view the global scene of interest (reference image 20) while, at the same time, viewing some portion (the area of interest 12) of the scene in a zoomed state. The location of the portion is indicated on the reference image 20 by frame 24. Thus, through frame 24, the movement of the camera 10 around the searching area 14 is continually provided to the user. If the user decided that the zoomed image 22 contained an object of interest, for example, the tractor 38 of image 22b, he could mark it. The location of tractor 38 is noted and stored and marked on the reference image 20. When the user returns to the vicinity of the tractor 38, the mark will also be displayed in the zoomed image 22.

Figures 3, 5:
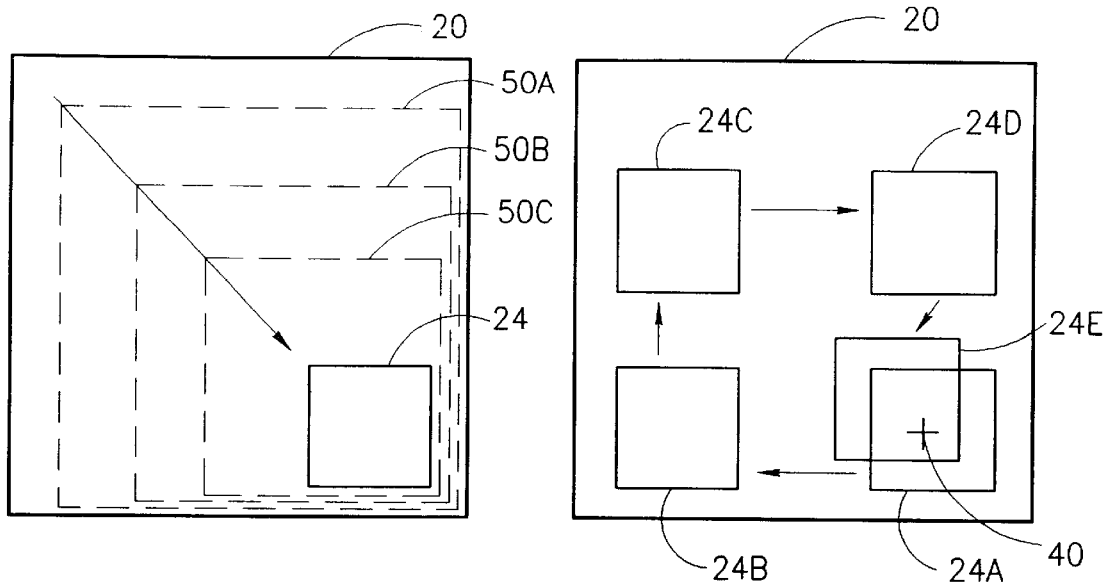
FIG. 3 is an illustration of a method of moving about the reference image, useful in understanding the operation of the system of FIG. 1.
FIG. 5 is an illustration of a series of transformations useful in understanding the operation of a transformation unit forming part of the system of FIG. 4.

The marking is shown in FIG. 3 which shows a schematic reference image 20 and a series of frames 24a, 24b, 24c, 24d and 24e. When looking at the zoomed image from frame 24a, the user marked an object. The mark, labeled 40, is displayed on reference image 20. The user then moved camera 10 about, looking at the areas noted by frames 24b, 24c and 24d. Nothing of interest was found there, so the user continued to the area noted by frame 24e. Since frame 24e overlaps the area of frame 24a including the object marked by mark 40, the zoomed image 22 corresponding to frame 24e will be displayed with mark 40.

Figure 4:
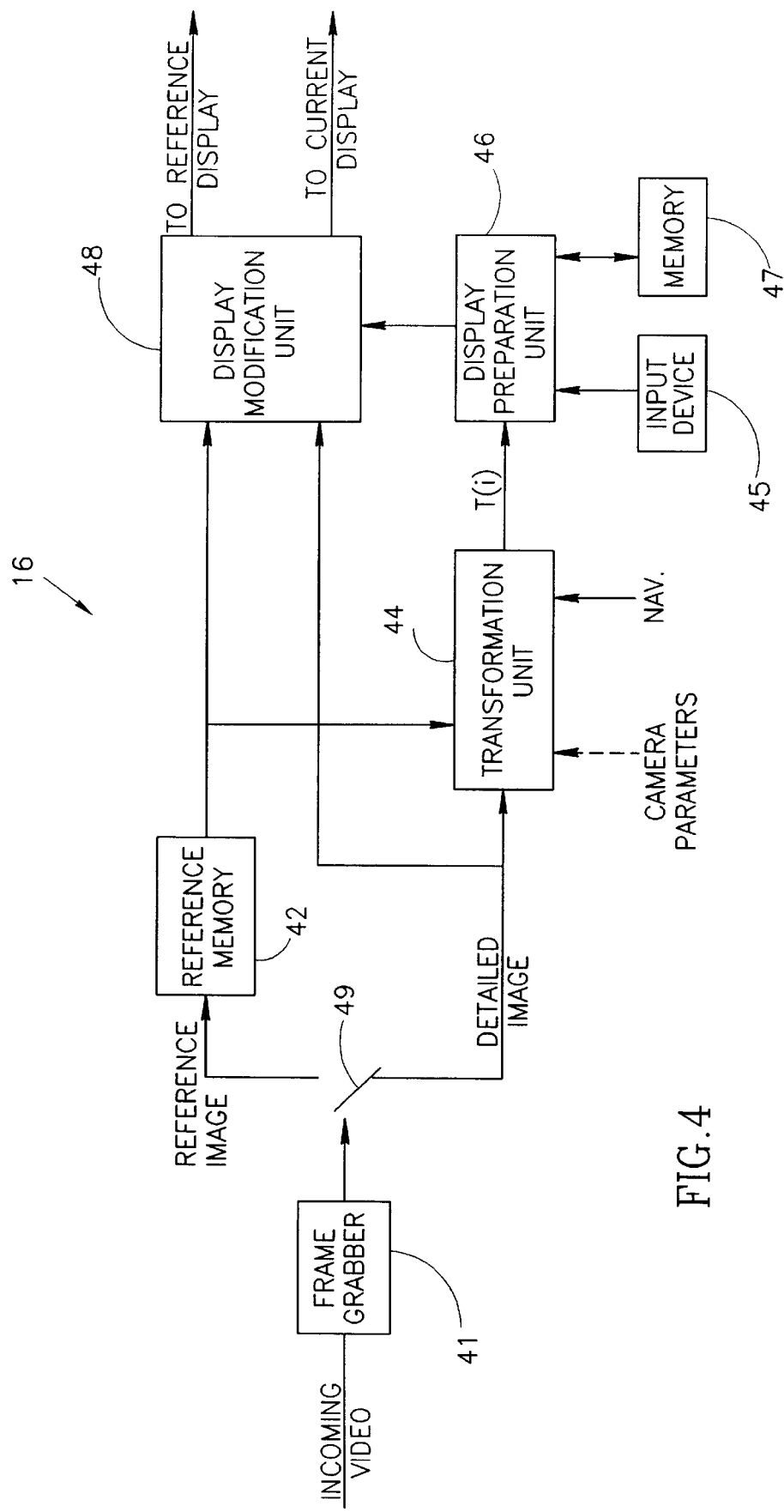
FIG. 4 is a block diagram illustration of the elements of the orientation system of FIG. 1.

Reference is now made to FIG. 4 which illustrates the elements of image processor 16. Image processor 16 comprises a frame grabber 41, a reference memory 42, a transformation unit 44, a display preparation unit 46 and a display modification unit 48.

The frame grabber 41 captures a frame of data from an incoming video signal. If the captured frame is of the searching area 14, the frame is stored in reference memory 42. Otherwise, it is provided to the transformation unit 44. This "if" operation is noted in FIG. 4 by a switch 49.

The transformation unit 44 determines a transformation T(i) between the reference image 20 and the current zoomed image 22. The display preparation unit 46 determines the locations of the frame 24 and the marks 40 which are to be added to the reference image 20 and/or the zoomed image 22. The user indicates the objects to be marked through an input device 45. The locations of at least the marks 40 are stored in an associated memory 47.

The display modification unit 48 receives the location information from display preparation unit 46 and modifies the image data from the reference memory 42 and the frame grabber 41 to include the marks 40 and frames 24, as discussed hereinabove.

The transformation unit 44 generates a transformation T(i) between the reference image 20, denoted P(0), and the current zoomed image, denoted P(i). Since each zoomed image P(i) is only slightly different than the previous one P(i-1), the transformation T(i) can be determined geometrically. This is particularly true for continuous zooming and for movement around the searching area 14 at a single zoom value.

FIG. 5 illustrates the zooming operation. It shows the reference image 20, a frame 24 indicating the zoomed state of the zoomed image 22, and a number of intermediate zoomed states 50a, 50b and 50c. The transformation unit 44 determines a transformation T(i) for each of the zoomed states 50 and from them, can generate a transformation for the zoomed image 22, transforming points in the zoomed image 22 with points in the reference image 20. Similarly, when the camera 10 scans the searching area 14, as was shown in FIG. 3, each of the areas of interest 12 are near the previous ones and thus, can be correlated with its previous area. Since there is a continual chain of correlations the transformation from the reference image 20 to the current zoomed image 22 can be determined.

The transformation T(i) is utilized to associate any point, or pixel, in the current zoomed image 22 with the appropriate point in the reference image 20. Thus, if a point in the current area of interest is marked, as shown by the mark 40 in FIG. 3, its position within the reference image 20 can be determined and saved.

Figure 6:
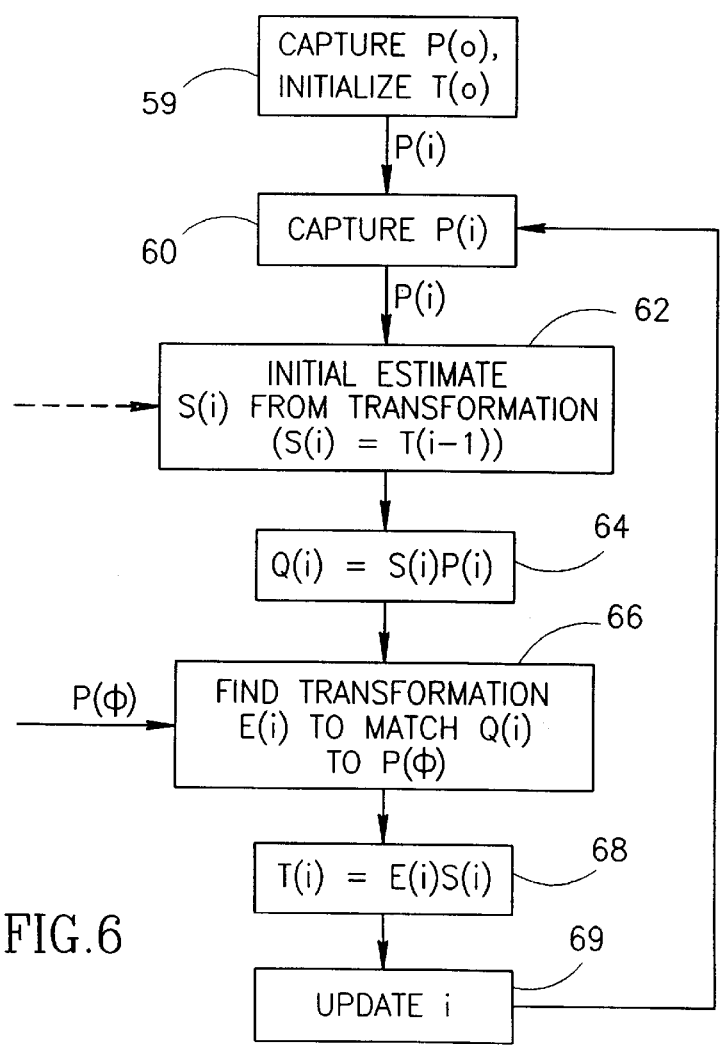
FIG. 6 is a flow chart illustration of a method of determining the transformations of FIG. 5.

Reference is now made to FIG. 6 which illustrates one method of generating the transformation T(i). In step 60, the current image is captured by frame grabber 41 (technically, this step is not performed by transformation unit 42). In step 62, an estimate S(i) of the transformation is generated. The estimate S(i) can be set to the previous value of the transformation, T(i-1). Alternatively, external information, such as the change in the size of the field of view, navigation information, or changes in the angle of the camera 10, can also be utilized to estimate what the new transformation might be.

In step 64, the new estimated transformation S(i) is utilized to generate an image Q(i) which should be similar to the reference image 20. The operation is indicated by:

$$Q(i)=S(i)*P(i) \qquad (1)$$

and can be performed by any suitable method. If the resolution has changed, a pyramidal method for reducing resolution along with a bilinear interpolation can be utilized. Pyramidal resolution reducing methods are discussed in the following article which is incorporated herein by reference: P. J. Burt, et al., "Object Tracking with a Moving Camera", *Proceedings of the Workshop on Visual Motion*, 1989, pp. 2–12.

In step 66, the image Q(i) is compared to the reference image P(0) and, if they do not exactly match, a further transformation E(i) is generated to transform Q(i) into the reference image P(0). E(i) can be any suitable transformation, such as the Afine transformation defined in equation 2, hereinbelow:

$$(X',Y')=(K1+K2*X+K3*Y, K4+K5*X+K6*Y) \qquad (2)$$

where (X,Y) are the coordinates of Q(i) and (X',Y') are the coordinates of the reference image P(0). The Afine transformation is defined by the variables Ki.

Other suitable transformations are known which warp one image into another. The following articles, which are incorporated herein by reference, describe such transformations but are not an exhaustive list:

P. J. Burt, et al., "Object Tracking with a Moving Camera", *Proceedings of the Workshop on Visual Motion*, 1989, pp. 2–12;

R. D. Holen, "An MTI (Moving Target Indicator) Algorithm for Passive Sensors", *National Aerospace and Electronics Conference,* 1980, pp. 114–121; and M. Irani, et al. "Computing Occluding and Transparent Motion", *International Journal of Computer Vision,* 1993.

The following articles mention suitable transformations as part of their discussion of motion tracking; the articles are incorporated herein by reference:

G. Adiv, "Determining Three-dimensional Motion and Structure from Optical Flow Generated by Several Moving Objects", IEEE Transactions on Pattern Analysis and Machine Intelligence, Vol. PAMI-7, No. 4, pp. 384 401, 1985;

P. Anandan, "A Computational Framework and an Algorithm for the Measurement of Visual Motion", International Journal of Computer Vision, Vol. 2, pp. 283–310, 1989;

C. S. Clark, et al., "High Accuracy Model Matching for Scenes Containing Man-Made Structures", Proceedings of the SPIE, Vol. 186, pp. 54–62, 1979; and C. S. Clark et al., "Matching of Natural Terrain Scenes", Proceedings of the International Conference on Pattern Recognition, pp. 217–222, 1980.

In step 68, the matching transformation E(i) is combined with the estimated transformation S(i) to produce the new transformation T(i) from the current zoomed image 22 to the reference image 20. As shown in FIG. 6, the operation is:

$$T(i)=E(i)*S(i) \qquad (3)$$

Once the new transformation T(i) has been determined, the running variable i is updated (step 69) and the process begins again at step 60 with a new zoomed image 22.

Each transformation T(i) relates the pixels of the current zoomed image 22 with pixels of the reference image 20. Thus, when the user marks an object in the zoomed image 22, the location, herein noted (x,y), of that object, within the reference image 20, is known. The location (x,y) is simply:

$$(x,y)=T(i)*(a,b) \qquad (4)$$

where (a,b) are the coordinates of the object in the zoomed image 22. The location (x,y) within the reference image 20, rather than the location (a,b) in the current zoomed image 22, is stored in memory 47.

The display preparation unit 46 utilizes the transformation T(i), as per equation 4 hereinabove, to determine the coordinates of the four corners of the zoomed image within the coordinate system of the reference image 20. The four corners define the portion of the reference image 20 which the current zoomed image 22 occupies. The display preparation unit 46 provides the four corners to the display modification unit 48, which, in turn, utilizes the four corners to draw the frame 24.

The display preparation unit 46 also provides, from memory 47, the locations, in the reference image 20 coordinates, of the entirety of already defined marks 40. These are to be displayed on the reference image 20.

The display preparation unit 46 also searches memory 47 for any marks 40 which reside within the portion defined by the four corners. If any are found, their locations are transformed, using the inverse of transformation T(i), into the coordinate system of the zoomed image 22. The transformed locations are provided to the display modification unit 48 which, in turn, displays the marks within the zoomed image 22.

Using standard graphical tools, the display modification unit 48 converts the four corners into a frame at the appropriate locations within the reference image 20. It also places a mark (a cross, a star, etc.) at the mark locations of the reference image 20. It places a similar mark, though of larger dimension, at the mark locations in the zoomed image 22.

It will be appreciated that the present invention can also be utilized when moving from one search area to the next. The present reference image 20 becomes a "zoomed image"

and the transformation operation is performed between reference images 20.

It will further be appreciated that the reference image 20 does not need to be taken a few seconds prior to beginning the zooming to the zoomed image 22. The reference image 20 can also be a photograph whose location of the searching area it shows is known. An image of the photograph is produced (by scanning or by some other means) and stored in the reference memory 42. The procedure followed is the same as that described hereinabove with the exception that the first transformation is determined through repeated matching iterations.

It will further be appreciated by persons skilled in the art that the present invention is not limited to what has been particularly shown and described hereinabove. Rather the scope of the present invention is defined only by the claims which follow:

What is claimed is:

1. A visual orientation system comprising,
   a storage device which stores a reference image captured by a vision sensing device;
   a camera which captures a sequence of second images;
   a transformation unit which generates an image transformation from one or more pixels of said reference image and one or more pixels of said second images, said image transformation transforming said second images into relevant pixels of said reference image; and
   display means which displays said reference image, said second image currently viewed by said camera, and a frame indicating location of said currently viewed second image within said reference image.

2. A system according to claim 1 and wherein said display means includes means for indicating an object of interest and means for displaying a mark in at least said reference image indicating the location of said object of interest.

3. A system according to claim 2 and wherein said means for displaying a mark includes means for displaying said mark additionally in said current image if said current image views a portion of said scene in which an object has already been marked.

4. A system according to claim 1 and wherein said transformation means comprises means for utilizing previous transformations to determine the current transformation.

5. A system according to claim 1 and wherein said transformation means comprises means for utilizing external camera information and for utilizing previous transformations to determine the current transformation.

6. A system according to claim 1 and wherein said camera is movable.

7. A system according to claim 1 and wherein said camera is stationary.

8. A system according to claim 1 and wherein said reference image is received from said camera.

9. A system according to claim 1 and wherein said reference image is received externally.

10. A system according to 1, wherein said reference image has a first field of view, and each of said second images has a second field of view, wherein each of said second fields of view is smaller than said first field of view.

11. A visual orientation system, said system comprises,
    a first image;
    a sequence of second images;
    a transformation unit which generates an image transformation from at least a portion of said second images and at least a portion of said first image, said image transformation transforming said second images into relevant pixels of said reference image; and
    a combination image of said first image and a frame indicating a location of a current second image within said first image.

12. A system according to 11 wherein said first image has a first field of view and each of said second images has a second field of view, wherein said second field of view is smaller than said first field of view.

13. A method for visual orientation, the method comprising the steps of:
    storing a reference image;
    capturing a sequence of second images;
    when said second images overlap with at least a portion of said reference image, generating an image transformation from one or more pixels from said second images and one or more pixels of said reference image, said image transformation transforming said second images into relevant pixels of the reference image; and
    continuously displaying said reference image, a currently captured second image, and a frame indicating location of said currently viewed second image within said reference image.

14. A method according to claim 13 and wherein said first step of displaying includes the step of indicating an object of interest and displaying a mark in at least said reference image indicating the location of said object of interest.

15. A method according to claim 14 and wherein said step of displaying a mark includes the step of displaying said mark additionally in said currently viewed zoomed image if said currently viewed zoomed image views a portion of said searching area in which an object has already been marked.

16. A method according to claim 13 and wherein said step of generating transformations comprises the step of utilizing previous transformations to determine the current transformation.

17. A method according to claim 13 and wherein said step of generating transformations comprises the steps of utilizing external information and of utilizing previous transformations to determine the current transformation.

18. A method according to claim 13 and wherein said reference image is received from a camera.

19. A method according to claim 13 and wherein said reference image is received externally.

20. A visual orientation system comprising:
    a storage device which stores a reference image captured by a vision sensing device;
    a camera which captures a sequence of second images;
    a transformation unit which generates an image transformation from one or more pixels of said reference image and one or more pixels of said second images, said image transformation effecting a zoom in from said second image to a portion of said reference image; and
    display means which displays said reference image, said second image currently viewed by said camera and a frame indicating location of said currently viewed second image within said reference image.

21. A system according to claim 20 and wherein said display means includes means for indicating an object of interest and means for displaying a mark in at least said reference image indicating the location of said object of interest.

22. A system according to claim 21 and wherein said means for displaying a mark includes means for displaying said mark additionally in said current image if said current image views a portion of said scene in which an object has already been marked.

23. A system according to claim 20 and wherein said transformation means comprises means for utilizing previous transformations to determine the current transformation.

24. A system according to claim 20 and wherein said transformation means comprises means for utilizing external camera information and for utilizing previous transformations to determine the current transformation.

25. A system according to claim 20 and wherein said camera is movable.

26. A system according to claim 20 and wherein said camera is stationary.

27. A system according to claim 20 and wherein said reference image is received from said camera.

28. A system according to claim 20 and wherein said reference image is received externally.

* * * * *